United States Patent
Hirakawa (10) Patent No.: US 11,747,964 B2
(45) Date of Patent: Sep. 5, 2023

(54) INFORMATION PROCESSING APPARATUS, DEVICE CONTROL APPARATUS, AND NON-TRANSITORY COMPUTER READABLE MEDIUM FOR RESTRICTING PREDETERMINED INPUT DURING TRANSITION TO AND FROM DEVICE SETTING MODE

(71) Applicant: FUJIFILM BUSINESS INNOVATION CORP., Tokyo (JP)

(72) Inventor: Eri Hirakawa, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 113 days.

(21) Appl. No.: 16/893,599

(22) Filed: Jun. 5, 2020

(65) Prior Publication Data

US 2021/0096706 A1 Apr. 1, 2021

(30) Foreign Application Priority Data

Sep. 30, 2019 (JP) .................................. 2019-180324

(51) Int. Cl.
*G06F 3/0484* (2022.01)
*G06F 9/451* (2018.01)

(52) U.S. Cl.
CPC ............ *G06F 3/0484* (2013.01); *G06F 9/451* (2018.02)

(58) Field of Classification Search
CPC ...... G06F 3/0484; G06F 9/451; G06F 3/0483; G06F 1/1671; G06F 3/04847; H04N 1/00925; H04N 1/00405
USPC ....................................................... 715/764
See application file for complete search history.

(56) References Cited

U.S. PATENT DOCUMENTS

| | | | |
|---|---|---|---|
| 8,566,905 B2 | 10/2013 | Tanaka | |
| 9,686,441 B2 | 6/2017 | Tanaka | |
| 2009/0140056 A1* | 6/2009 | Leen | G05D 23/1917 236/49.3 |
| 2011/0222100 A1* | 9/2011 | Tanaka | H04N 1/00413 358/1.14 |
| 2015/0143506 A1* | 5/2015 | Sugano | G06F 21/608 726/17 |
| 2017/0339735 A1* | 11/2017 | Kawaguchi | H04W 76/14 |

(Continued)

FOREIGN PATENT DOCUMENTS

JP 2011-191952 A 9/2011
JP 2015-088837 A 5/2015

(Continued)

OTHER PUBLICATIONS

Jun. 20, 2023 Office Action issued in Japanese Patent Application No. 2019-180324.

*Primary Examiner* — Tuan S Nguyen
(74) *Attorney, Agent, or Firm* — Oliff PLC (57) ABSTRACT

An information processing apparatus includes: a receiver that receives an instruction to return to a home screen from a device settings screen; and a display controller that performs control in such a way that the returning to the home screen is prohibited in a case where the instruction is received by the receiver between commencement of processing to transition to a setting mode of a device and completion of the processing to transition to the setting mode, or between commencement of processing to end the setting mode of the device and completion of the processing to end the setting mode.

12 Claims, 11 Drawing Sheets

(56) References Cited

U.S. PATENT DOCUMENTS

| | | | |
|---|---|---|---|
| 2018/0068345 A1* | 3/2018 | Hirokawa | H04N 1/00482 |
| 2018/0285066 A1* | 10/2018 | Dozen | H04N 1/00403 |
| 2021/0037160 A1* | 2/2021 | Watanabe | H04N 1/00896 |

FOREIGN PATENT DOCUMENTS

| | | | |
|---|---|---|---|
| JP | 2017-073035 A | 4/2017 | |
| JP | 2018-074309 A | 5/2018 | |

\* cited by examiner

| | | |
|---|---|---|
| | GENERAL | |
| 📏 | MEASUREMENTS | |
| Z | READING ORDER | LEFT TO RIGHT |
| 🔑 | DATE & TIME | 02/18/2019 03:29AM |
| ⏰ | SYSTEM TIMEOUT | 30 SEC |
| ☀ | DISPLAY BRIGHTNESS | 4 |

INFORMATION PROCESSING APPARATUS, DEVICE CONTROL APPARATUS, AND NON-TRANSITORY COMPUTER READABLE MEDIUM FOR RESTRICTING PREDETERMINED INPUT DURING TRANSITION TO AND FROM DEVICE SETTING MODE

CROSS-REFERENCE TO RELATED APPLICATIONS

This application is based on and claims priority under 35 USC 119 from Japanese Patent Application No. 2019-180324 filed Sep. 30, 2019.

BACKGROUND

(i) Technical Field

The present disclosure relates to an information processing apparatus, a device control apparatus, and a non-transitory computer readable medium.

(ii) Related Art

Japanese Unexamined Patent Application Publication No. 2011-191952 discloses an electronic device in which application programs can be installed, the electronic device including: a system controller that controls switching between application programs to be displayed on a display unit; a display controller that causes the display unit to display an operation screen corresponding to an application program designated to be displayed by the system controller; and a request receiving unit that receives a request to start exclusive use of the display unit by the application program, and a request to end the exclusive use. In a case where there is an application program for which the request receiving unit has received a request to start the exclusive use, the system controller does not switch the display target from the application program to another application program until a request to end the exclusive use by the application program is received.

Japanese Unexamined Patent Application Publication No. 2017-73035 discloses an information processing apparatus that executes processing related to an application via a processing unit, the information processing apparatus including: an acquisition unit that acquires a setting job that instructs the processing related to the application; a determination unit that determines whether or not the processing unit has an operation authority for processing included in the setting job; a transfer unit that, in a case where the determination unit determines that the processing unit does not have the operation authority for predetermined processing included in the setting job, transfers the operation authority for the predetermined processing to the processing unit; and a deprivation unit that deprives the processing unit of the operation authority for the predetermined processing after completion of the predetermined processing carried out by the processing unit to which the operation authority for the predetermined processing has been transferred by the transfer unit.

Japanese Unexamined Patent Application Publication No. 2015-88837 discloses a display device in which it is possible to set a normal mode, a restricted mode in which at least some functions are restricted, and a semi-restricted mode that can be implemented before transitioning from the normal mode to the restricted mode. The display device includes: a display unit; a receiving unit that receives input by a user; and a setting unit that sets the semi-restricted mode when the receiving unit receives predetermined input, and sets the restricted mode in a case where a screen, displayed on the display unit on the basis of the input by the user immediately after the semi-restricted mode has been set, transitions to a screen that does not satisfy a predetermined condition.

SUMMARY

Aspects of non-limiting embodiments of the present disclosure relate to providing an information processing apparatus, a device control apparatus, and a non-transitory computer readable medium, which allow a device to exit from a state where the device is prohibited from operating, without increasing the number of user operations.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including: a receiver that receives an instruction to return to a home screen from a device settings screen; and a display controller that performs control in such a way that the returning to the home screen is prohibited in a case where the instruction is received by the receiver between commencement of processing to transition to a setting mode of a device and completion of the processing to transition to the setting mode, or between commencement of processing to end the setting mode of the device and completion of the processing to end the setting mode.

BRIEF DESCRIPTION OF THE DRAWINGS

Exemplary embodiments of the present disclosure will be described in detail based on the following figures, wherein.

DETAILED DESCRIPTION

Next, exemplary embodiments of the present disclosure will be described in detail with reference to the drawings.

Figure 1:
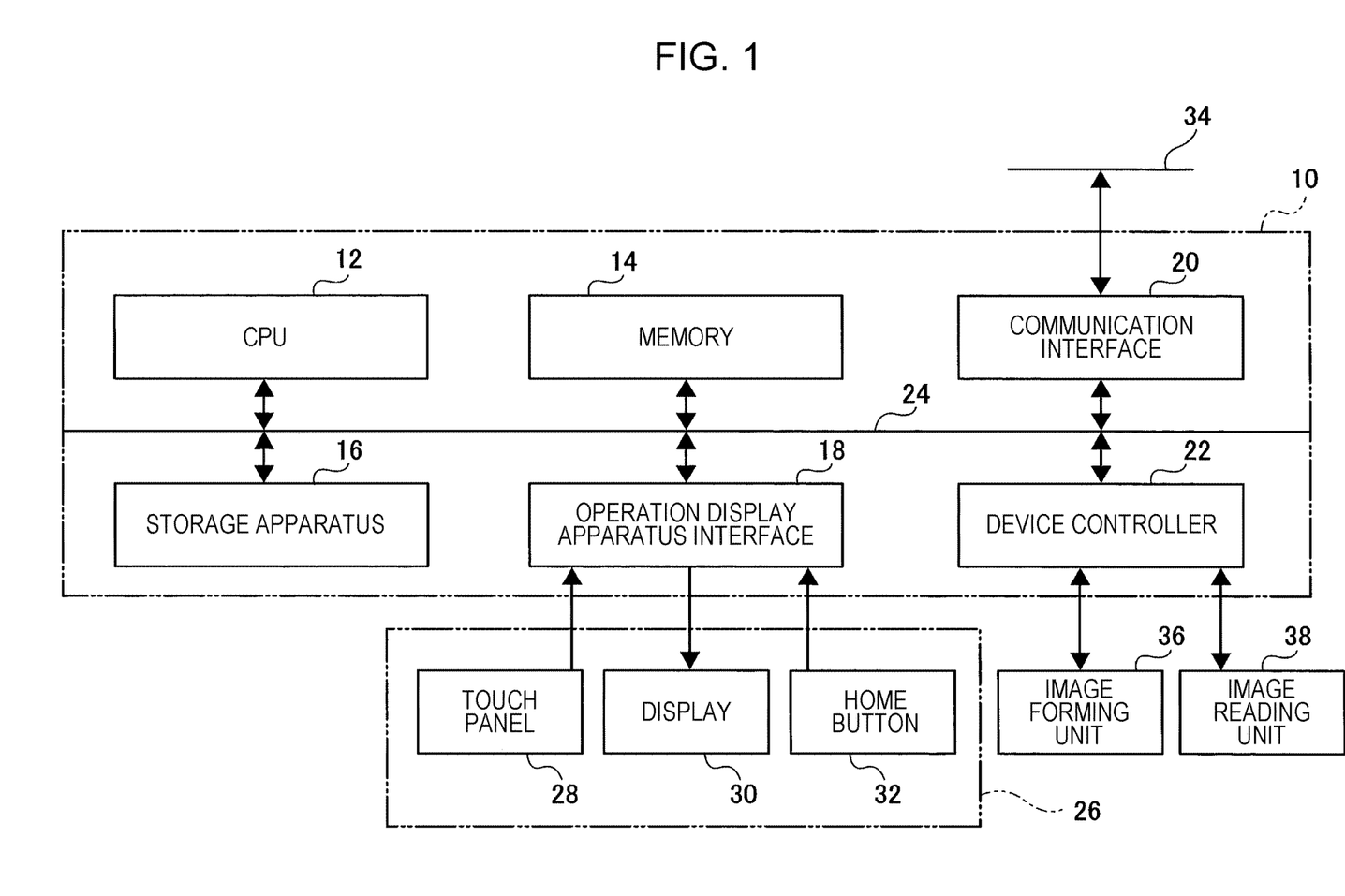
FIG. 1 is a block diagram depicting hardware of an information processing apparatus according to an exemplary embodiment of the present disclosure.

FIG. 1 depicts an information processing apparatus 10 according to an exemplary embodiment of the present disclosure. The information processing apparatus 10 is for controlling a device such as an image forming apparatus.

The information processing apparatus 10 has a CPU 12, memory 14, a storage apparatus 16, an operation display apparatus interface 18, a communication interface 20, and a device controller 22, and the CPU 12, the memory 14, the storage apparatus 16, the operation display apparatus interface 18, the communication interface 20, and the device controller 22 are connected via a bus 24.

The CPU 12 executes predetermined processing on the basis of a control program stored in the memory 14. The storage apparatus 16 is configured of a hard disk, for example, and stores required software and data. The operation display apparatus interface 18 has an operation display apparatus 26 connected thereto. The operation display apparatus 26 is provided with a touch panel 28, a display 30, and a home button 32, and is configured to receive operation data from the touch panel 28 and the home button 32 and send display data to the display 30.

The communication interface 20 is connected to a terminal apparatus and a server via a LAN (local area network) 34, receives requests for image forming from the terminal apparatus, and transmits images to the terminal apparatus and the server. The communication interface 20 is not restricted to using a LAN and may be connected to a terminal apparatus and a server via the Internet.

The device controller 22 is connected to an image forming unit 36 and an image reading unit 38, causes the image forming unit 36 to form images on a recording medium, and causes the image reading unit 38 to read documents.

Figure 2:
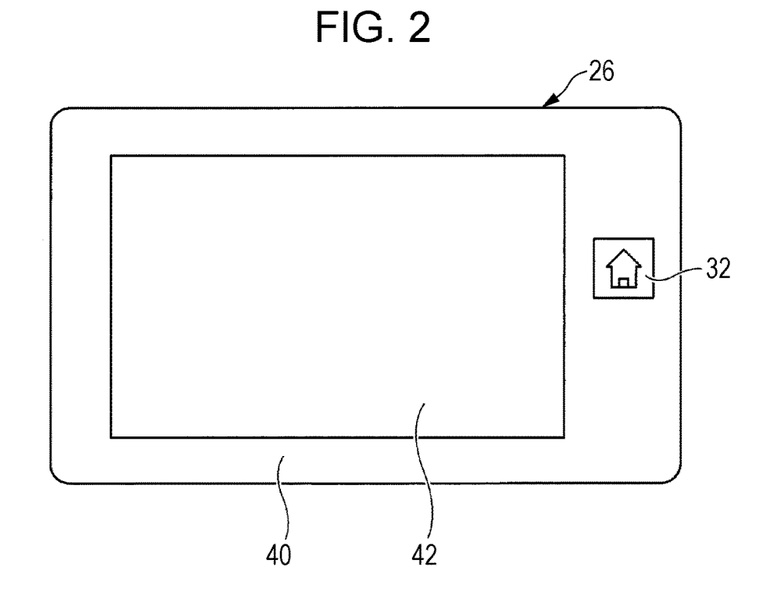
FIG. 2 is a plan view of an operation display apparatus used in an exemplary embodiment of the present disclosure.

FIG. 2 depicts the operation display apparatus 26 used in the exemplary embodiment of the present disclosure. The operation display apparatus 26 has an operation display apparatus main body 40, and this operation display apparatus main body 40 is provided with: a touch panel display 42 in which the aforementioned touch panel 28 and display 30 are combined; and the home button 32. The touch panel display 42 displays various types of operation buttons. The operation buttons displayed on the touch panel display 42 are software buttons that generate operation data when touched by a user, and the home button 32 is a hardware button configured of a mechanical switch. The hardware button and the software buttons are configured such that it is possible to perform input by pressing the hardware button and a software button at the same time; however, the software buttons are configured such that they cannot be pressed at the same time.

Figure 3:
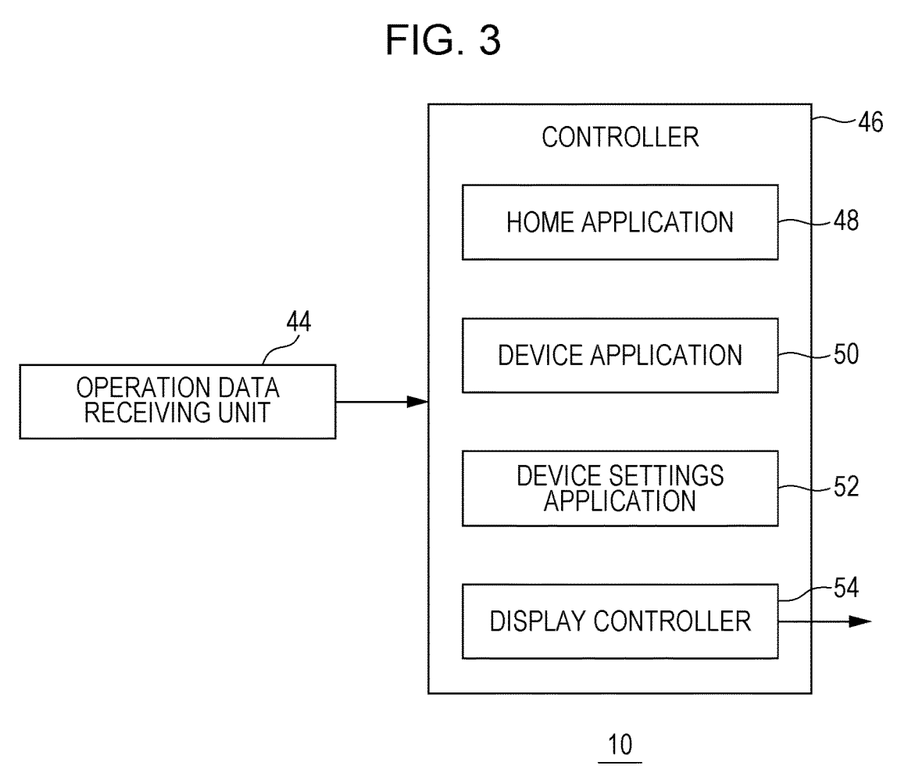
FIG. 3 is a block diagram depicting a software configuration of an information processing apparatus according to an exemplary embodiment of the present disclosure.

FIG. 3 depicts a software group for realizing the functions of the information processing apparatus 10.

The information processing apparatus 10 has an operation data receiving unit 44 that receives operation data. A controller 46 has home application software (hereinafter, referred to as a home application) 48, device application software (hereinafter, referred to as a device application) 50, and device settings application software (hereinafter, referred to as a device settings application) 52. Furthermore, the controller 46 has a display controller 54 that performs control in such a way that images generated by the applications 48, 50, and 52 are displayed on the touch panel display 42.

Figure 4:
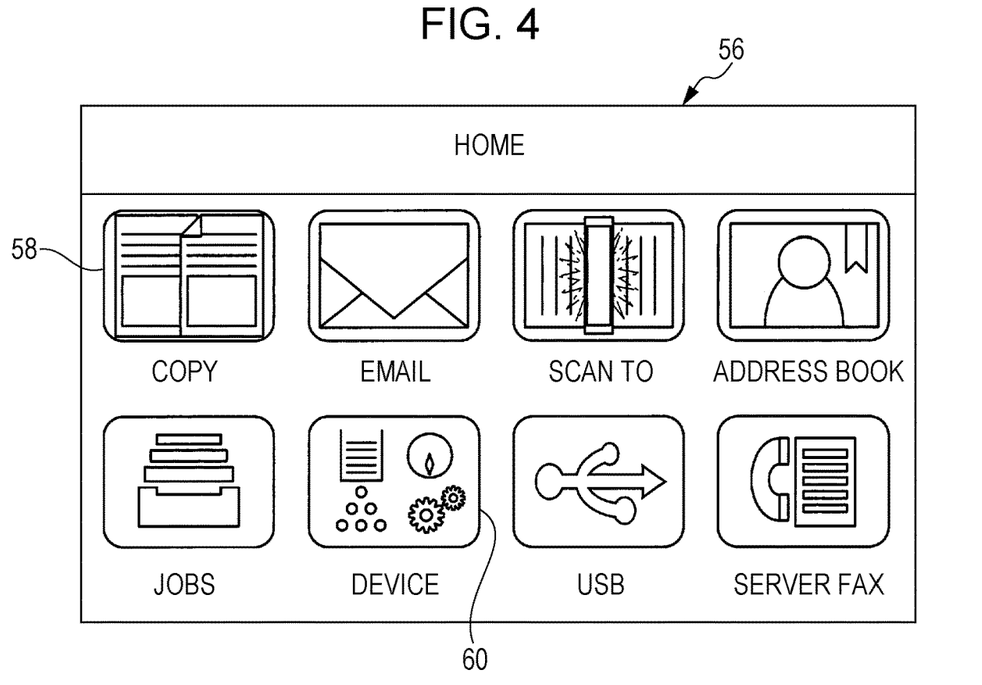
FIG. 4 is a screen diagram depicting a home screen in an information processing apparatus according to an exemplary embodiment of the present disclosure.

FIG. 4 depicts a home screen 56 generated by the home application 48. The home screen 56 displays operation buttons such as a copy button 58 for executing a job, and a device settings button 60. It should be noted that a job refers to a series of processing executed via a device.

Figure 5:
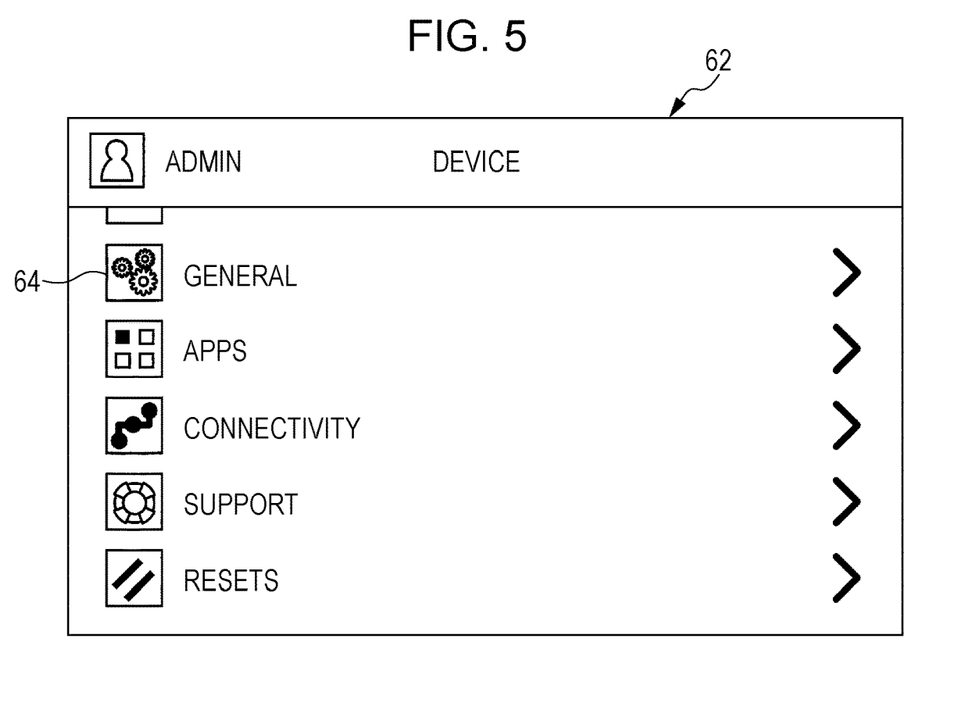
FIG. 5 is a screen diagram depicting a first device settings screen in an information processing apparatus according to an exemplary embodiment of the present disclosure.
Figure 6:
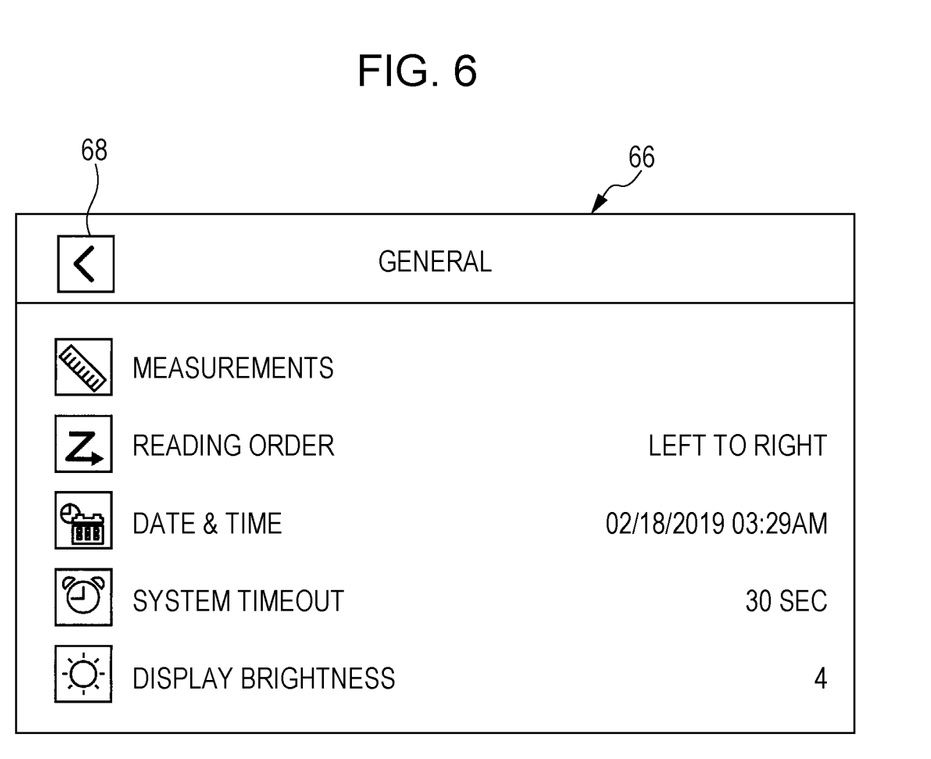
FIG. 6 is a screen diagram depicting a second device settings screen in an information processing apparatus according to an exemplary embodiment of the present disclosure.

When the device settings button 60 is tapped, a first device settings screen 62 is displayed, as depicted in FIG. 5. A general settings button 64 and the like are displayed on the first device settings screen 62. For example, when the general settings button 64 is tapped, a second device settings screen 66 that is a general function settings screen is displayed, as depicted in FIG. 6. A return instruction button 68 for returning to the first device settings screen 62 is displayed on the second device settings screen 66.

Next, an operation flow of the information processing apparatus 10 will be described.

Figure 7:
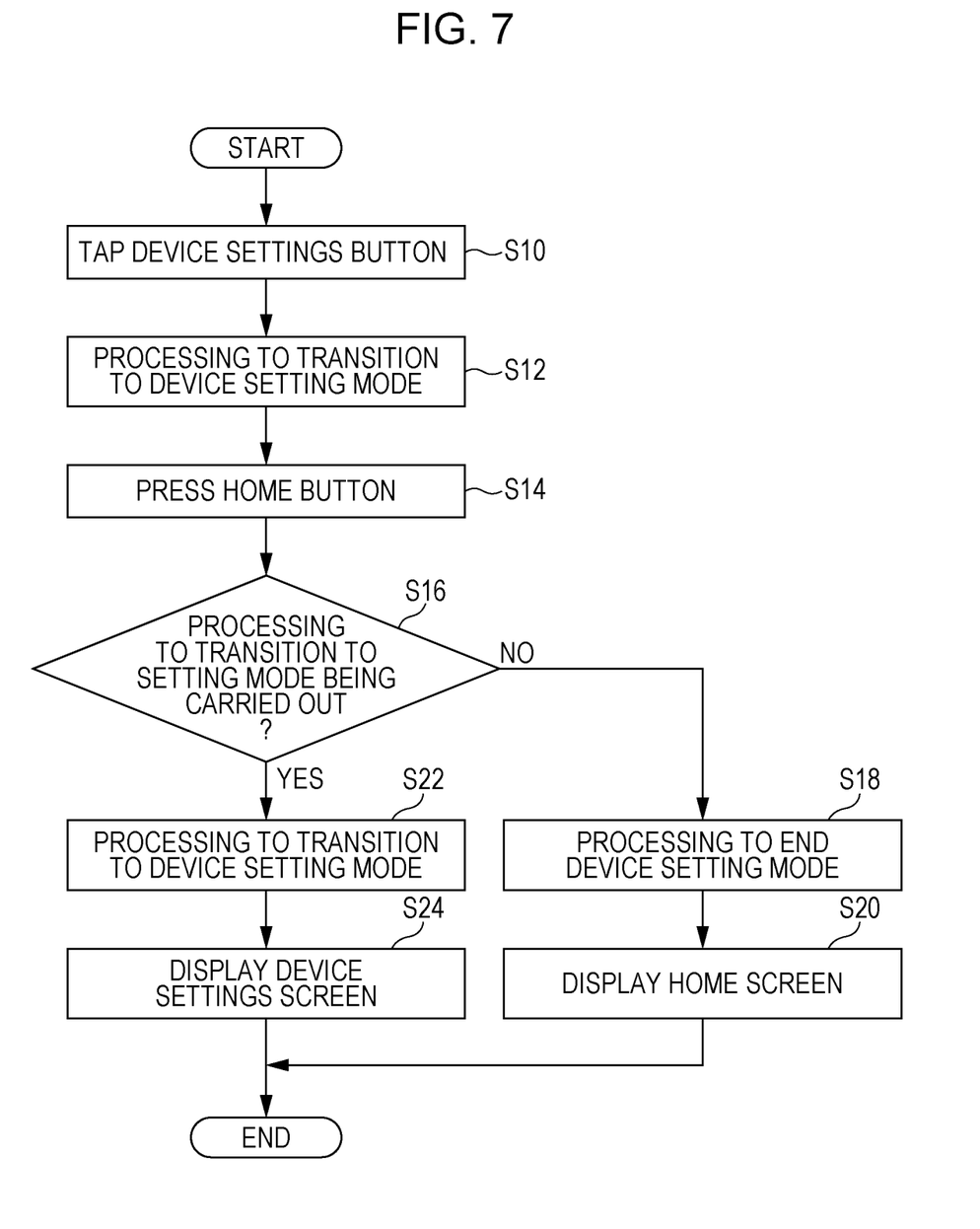
FIG. 7 is a flowchart depicting an operation flow of an information processing apparatus according to a first exemplary embodiment of the present disclosure.

FIG. 7 is a flowchart depicting an operation flow according to a first exemplary embodiment. This first exemplary embodiment relates to processing carried out when transitioning to a setting mode.

First, in step S10, if a user taps the device settings button 60, processing to transition to the setting mode is started in step S12.

In the next step S14, if the user presses the home button 32, it is determined in step S16 whether or not processing to transition to the setting mode is being carried out. In other words, it is determined whether or not the timing at which the home button 32 is pressed is before the processing to transition to the setting mode has ended.

Figure 8:
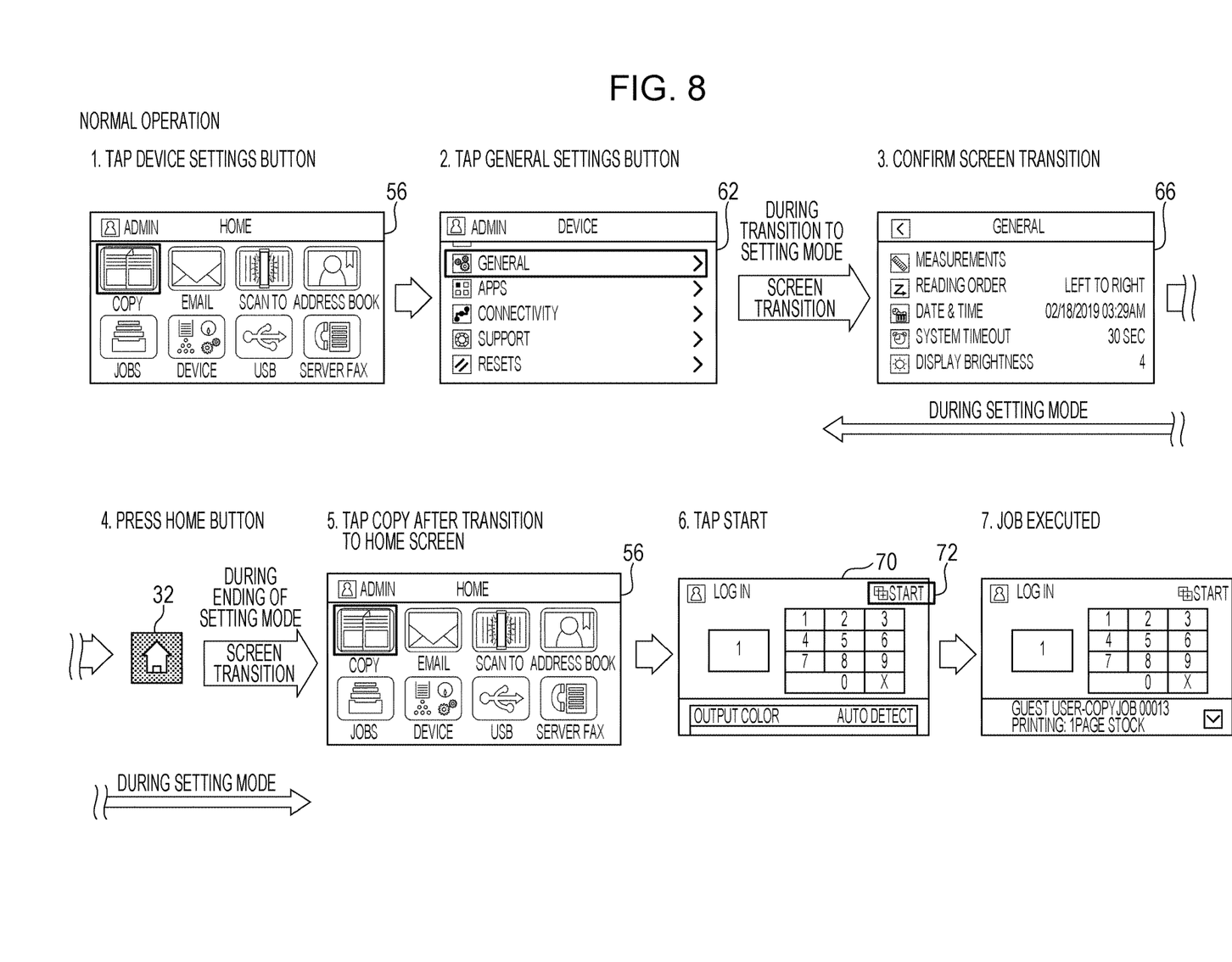
FIG. 8 is a screen transition diagram depicting transition between screens in a case where a home button is pressed after transition to a device setting mode has ended, in an operation flow of an information processing apparatus according to a first exemplary embodiment of the present disclosure.

In step S16, if it is determined that a transition to the setting mode is not being carried out, in other words, that processing to transition to the setting mode has ended, processing proceeds to step S18 in which processing to end the transition to the setting mode is carried out, and processing additionally proceeds to step S20 in which the home screen 56 is displayed. Thereafter, as depicted in FIG. 8, if the user taps the copy button 58, a copy start screen 70 is displayed. In the copy start screen 70, if a copy start button 72 is tapped, the device executes a copy operation.

It should be noted that, when the processing to transition to the setting mode has ended, as depicted in FIG. 8, the second device settings screen 66 is displayed, and it is possible to confirm that the processing to transition to the setting mode has ended.

On the other hand, in step S16, if it is determined that a transition to the setting mode is being carried out, in other words, that the home button 32 has been pressed before the processing to transition to the setting mode has ended, processing proceeds to step S22 in which processing to transition to the setting mode is carried out regardless of the home button 32 having been pressed, the first device settings screen 62 is displayed in the next step S24, and processing ends.

Figure 9:
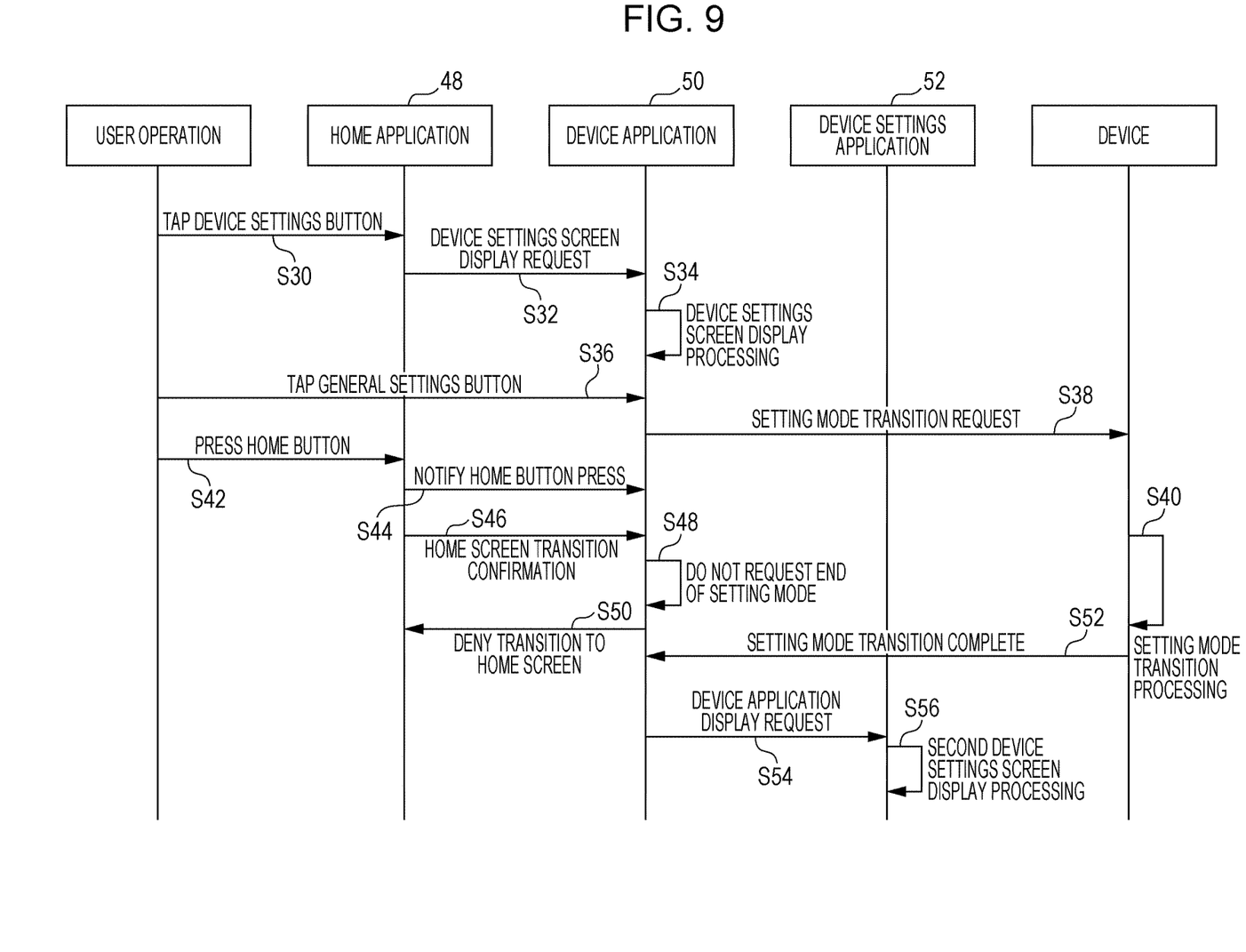
FIG. 9 is a sequence diagram depicting an operation flow of an information processing apparatus according to a first exemplary embodiment of the present disclosure.
Figure 10:
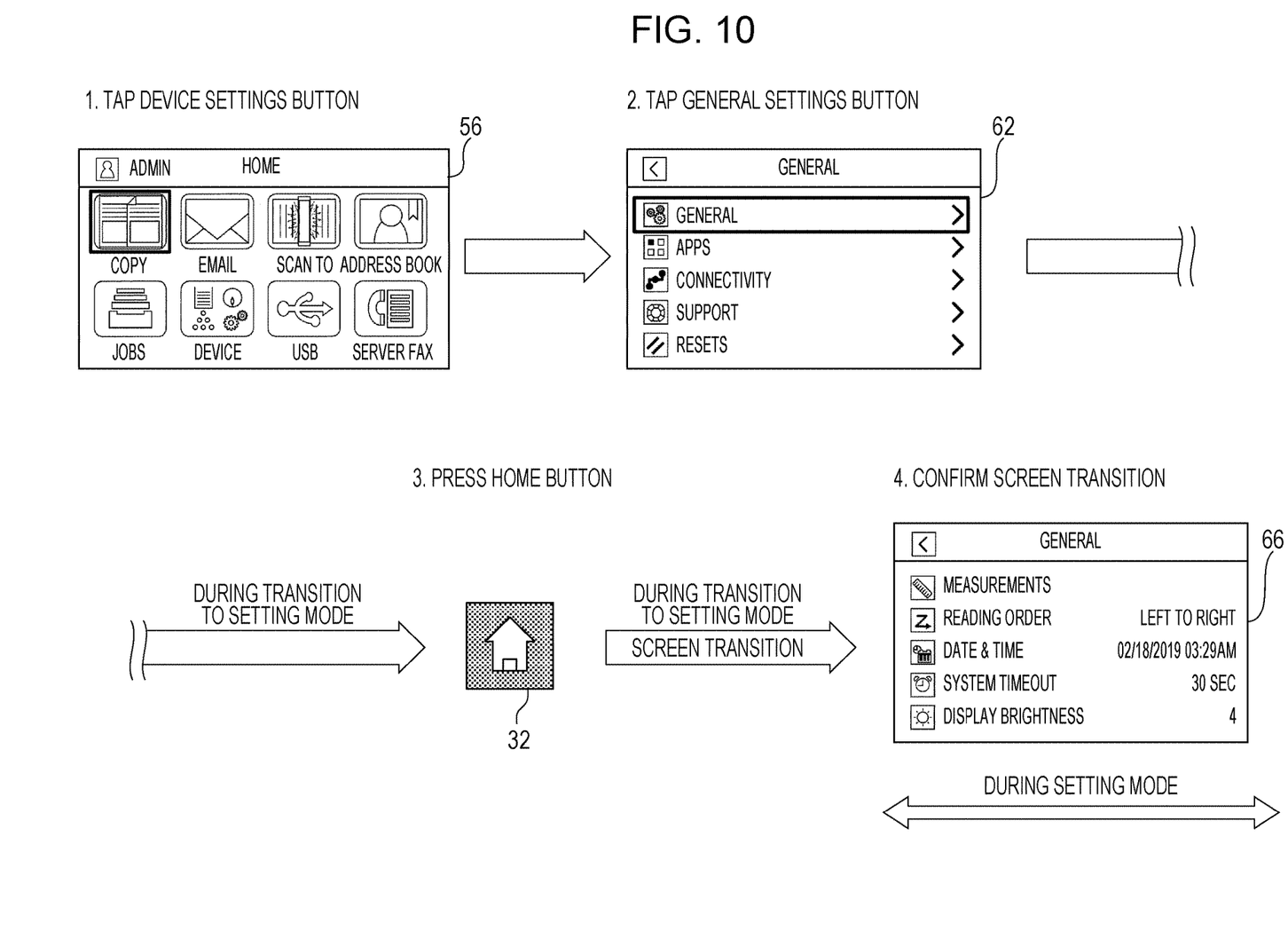
FIG. 10 is a screen transition diagram depicting transition between screens in a case where a home button is pressed before transition to a device setting mode has ended, in an operation flow of an information processing apparatus according to a first exemplary embodiment of the present disclosure.

FIG. 9 is a sequence diagram depicting an operation flow according to the first exemplary embodiment. FIG. 10 is a transition diagram depicting transition between screens in the first exemplary embodiment.

First, in step S30, if the user taps the device settings button 60, the home application 48 receives indication that the device settings button 60 has been tapped, and in step S32 requests the device application 50 to display the first device settings screen 62. In step S34, the device application 50 displays the first device settings screen 62.

Next, in step S36, if the user taps the general settings button 64, the home application 48 receives indication that the general settings button 64 has been tapped, and in step S38 requests the device to carry out processing to transition to the setting mode. The device having received the request to carry out processing to transition to the setting mode executes the processing to transition to the setting mode in step S40.

In step S42, if the user presses the home button 32 while the device is transitioning to the setting mode, the home application 48 receives indication that the home button 32 has been pressed, in step S44 notifies the device application 50 that the home button 32 has been pressed, and additionally obtains confirmation of a transition to the home screen 56. In step S48, the device application 50 does not request the device to end the processing to transition to the setting mode. Furthermore, in step S50, the device application 50 denies the home application 48 to return to the home screen 56. In other words, as depicted in FIG. 10, even if the home button 32 has been pressed, a transition to the setting mode is executed, and the second device settings screen 66 is displayed.

In step S40, if the device has ended processing to transition to the setting mode, in step S52, the device notifies the device application 50 that processing to transition to the setting mode has ended. The device application 50 having received this notification requests the device settings application 52 to display the second device settings screen 66. The device settings application 52 having received this request displays the second device settings screen 66 in step S56, and processing ends.

Here, assuming that the user is returned to the home screen 56 in a case where the home button 32 is pressed before processing to transition to the setting mode has ended, if the user taps the copy button 58 from the home screen 56, the aforementioned copy start screen 70 is displayed, but because the processing to transition to the setting mode has not ended, the device is not able to start a copy operation. In contrast, in the first exemplary embodiment, even if the home button 32 is pressed, returning to the home screen 56 is prohibited before processing to transition to the setting mode has ended, and the second device settings screen 66 is displayed.

Figure 11:
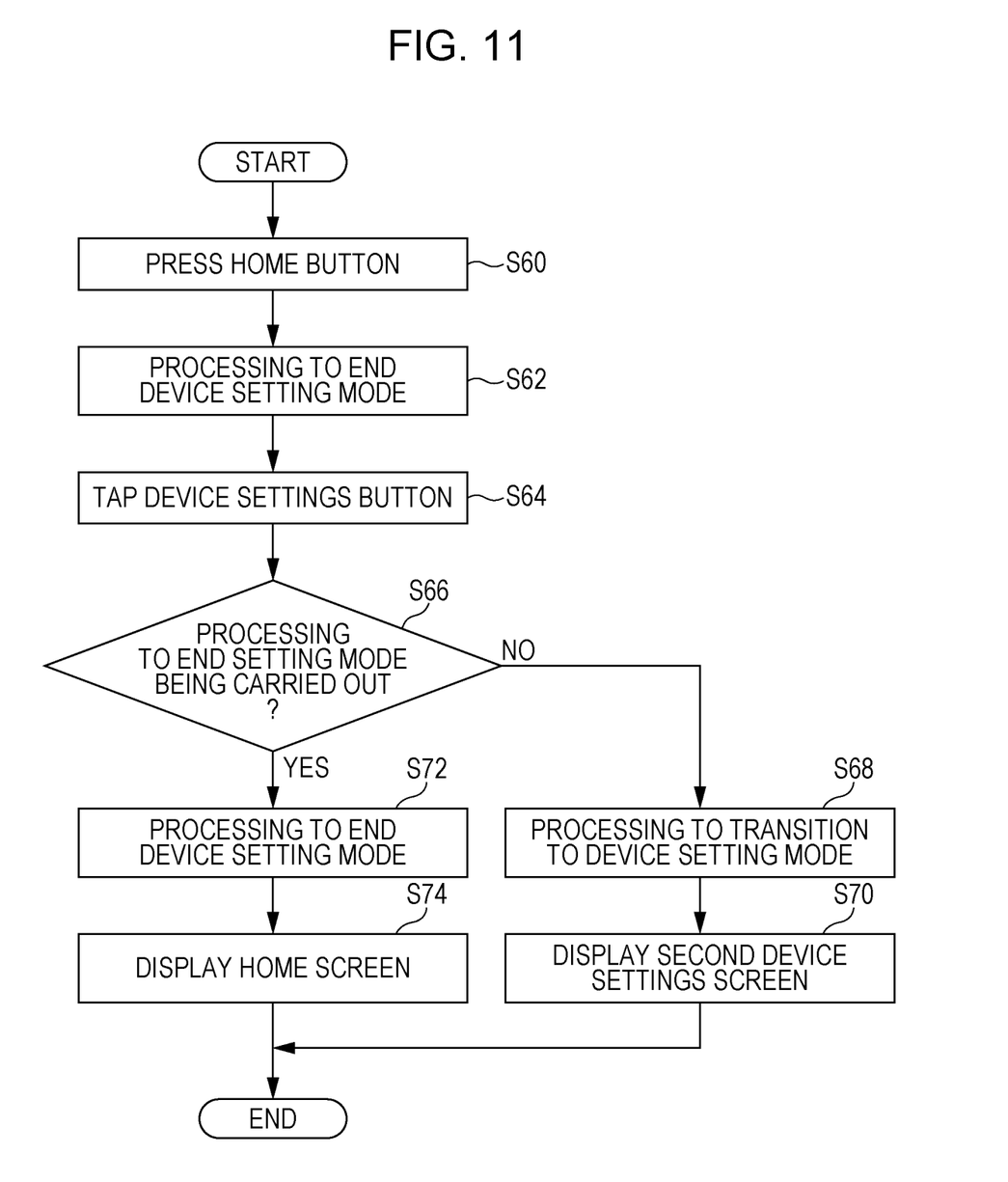
FIG. 11 is a flowchart depicting an operation flow of an information processing apparatus according to a second exemplary embodiment of the present disclosure.

FIG. 11 is a flowchart depicting an operation flow according to a second exemplary embodiment. The second exemplary embodiment relates to processing carried out when the setting mode has ended.

First, in step S60, if the user presses the home button 32 while the first device settings screen 62 is being displayed, processing to end the setting mode is carried out in step S62. In the next step S64, a general settings button 64 of the first device settings screen 62 is tapped.

In the next step S66, it is determined whether or not processing to end the setting mode is being carried out, in other words, whether or not the general settings button 64 has been tapped before processing to end the setting mode has ended. If it is determined that processing to end the setting mode is not being carried out, in other words, that the general settings button 64 has been tapped after processing to end the setting mode has ended, processing proceeds to step S68, processing to transition to the setting mode is executed, in addition the second device settings screen 66 is displayed, and processing ends.

On the other hand, in step S66, if it is determined that processing to end the setting mode is being carried out, in other words, that the general settings button 64 has been tapped before processing to end the setting mode has ended, processing proceeds to step S72 in which processing to end the setting mode is carried out regardless of the general settings button 64 having been pressed, the home screen 56 is displayed in the next step S74, and processing ends.

Figure 12:
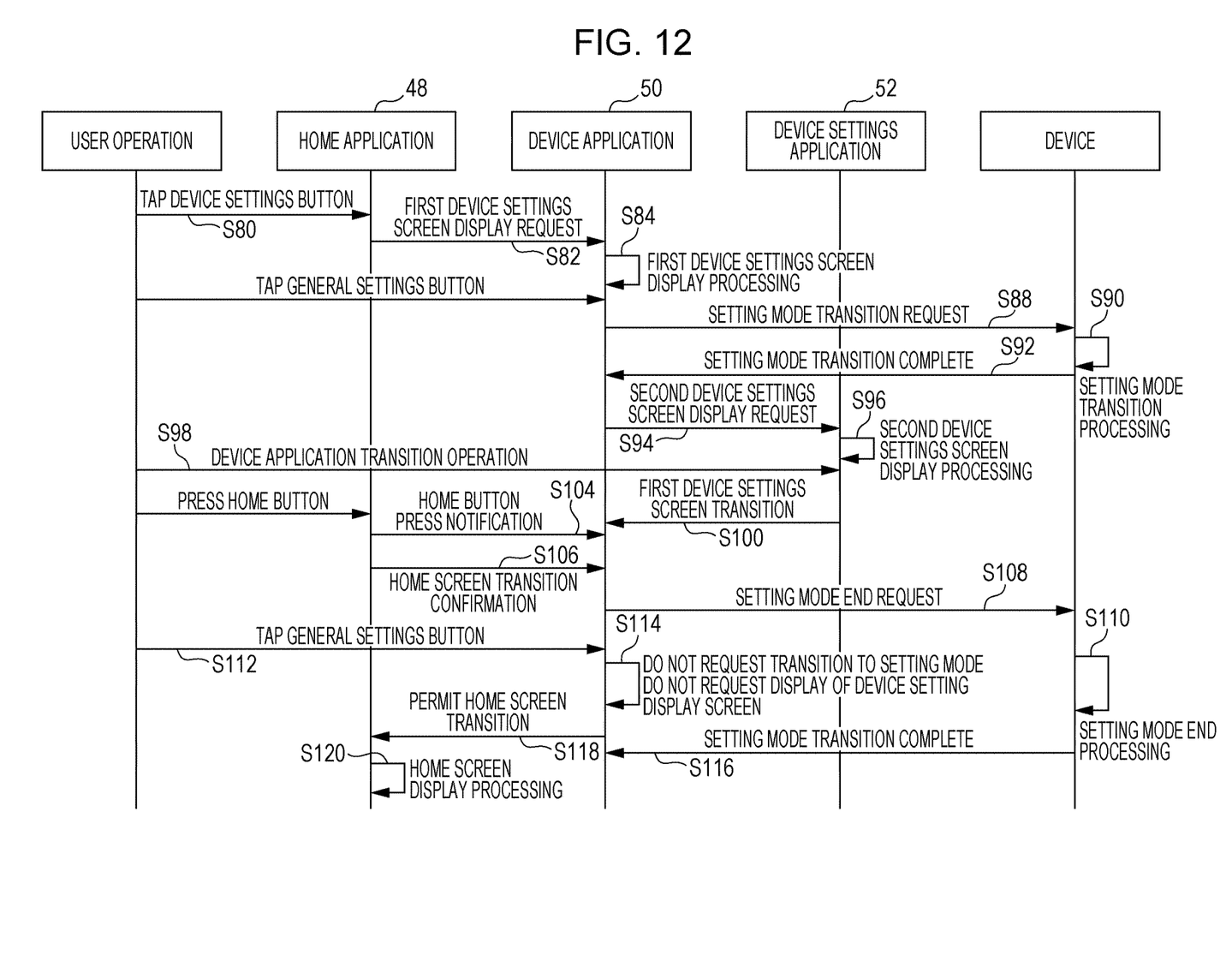
FIG. 12 is an explanatory diagram depicting an operation flow of an image forming system according to a second exemplary embodiment of the present disclosure.
Figure 13:
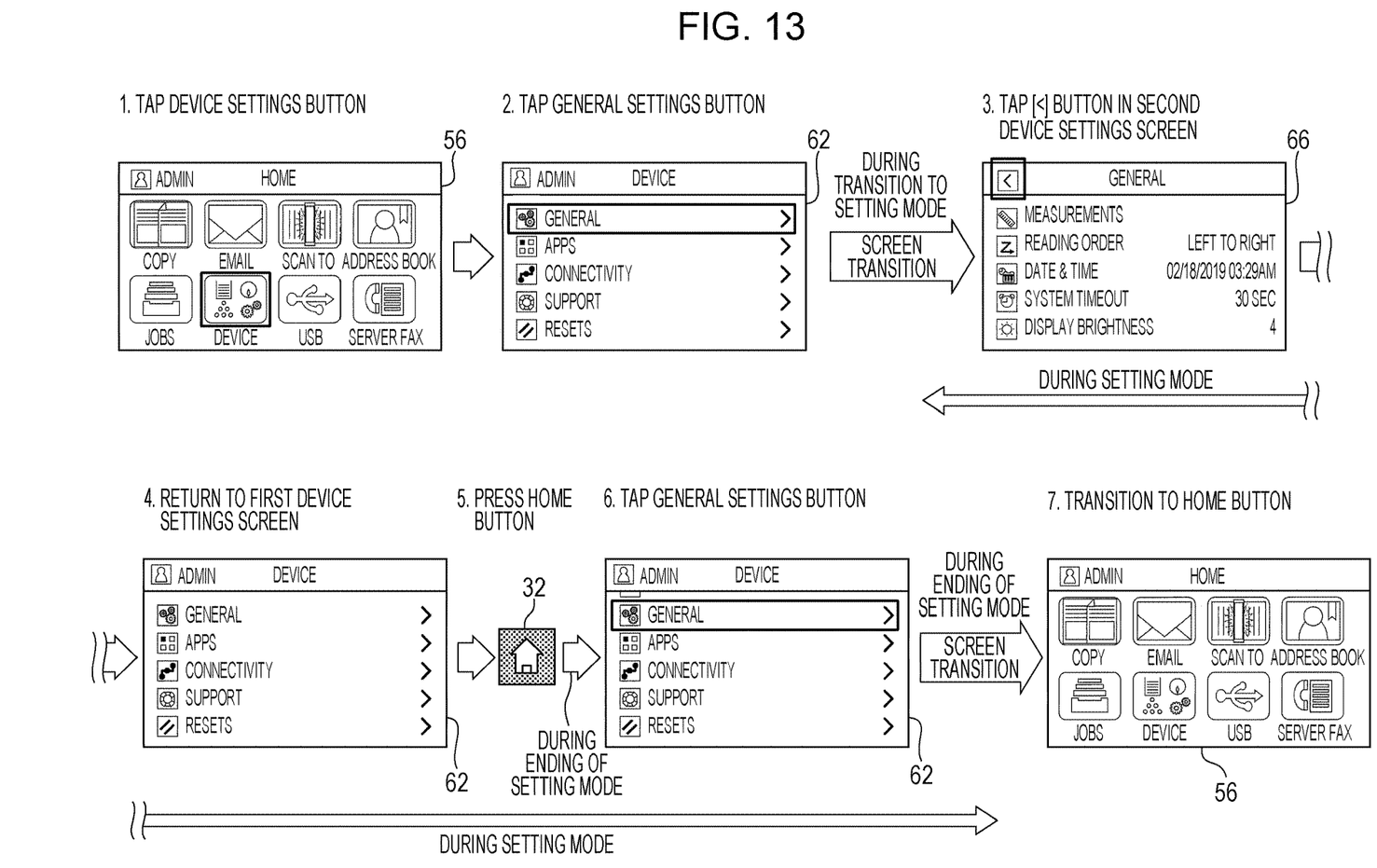
FIG. 13 is a screen transition diagram depicting transition between screens in an operation flow of an information processing apparatus according to a second exemplary embodiment of the present disclosure.

FIG. 12 is a sequence diagram depicting an operation flow according to the second exemplary embodiment. Furthermore, FIG. 13 is a screen transition diagram depicting transition between screens in the second exemplary embodiment.

First, in step S80, if the user taps the device settings button 60 while the home screen 56 is being displayed, the home application 48, in step S82, requests the device application 50 to display the first device settings screen 62. In step S84, the device application 50 having received this request displays the first device settings screen 62.

Next, in step S86, if the user taps the general settings button 64, the device application 50, in step S88, requests the device to transition to the setting mode. In step S90, the device having received this request carries out processing to transition to the setting mode.

In step S90, if the processing to transition to the setting mode ends, the device, in step S92, notifies the device application 50 that the processing to transition to the setting mode has ended. In step S94, the device application 50 having received this notification requests the device settings application to display the second device settings screen 66. In step S96, the device settings application 52 having received this request displays the second device settings screen 66.

In step S98, if the user taps a return instruction button 68 in the second device settings screen 66, the device settings application 52, in step S100, requests the device application 50 to display the first device settings screen 62.

Next, in step S102, if the user presses the home button 32, the home application, in step S104, notifies the device application 50 that the home button 32 has been pressed, and in step S106 additionally obtains confirmation of a transition to the home screen 56.

Next, in step S108, the device application 50 requests the device to end the setting mode. In step S110, the device having received this request starts processing to end the setting mode.

Here, in step S112, if the user taps the general settings button 64 of the first device settings screen 62, the device application 50, in step S114, does not request the device to transition to the setting mode, and carries out processing that does not display the second device settings screen 66.

Next, in step S110, if the device has ended the processing to end the setting mode, in step S12, the device application 50 is notified that processing to end the setting mode has ended. In step S116, the device application 50 having received this notification obtains permission from the home application 48 to display the home screen 56. In step S118, the home application 48 displays the home screen 56 and processing ends.

In this way, in this second exemplary embodiment, in step S114, regardless of the general settings button 64 having been tapped in the first device settings screen, this tap operation of the device settings button 64 is ignored and processing is carried out to return to the home screen 56.

It should be noted that, although an image forming apparatus has been given as an example of a device in the aforementioned exemplary embodiments, the present disclosure is not restricted thereto and can also be applied to a smartphone, a television remote control, or the like.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
a hardware button that receives an instruction to return to a home screen from a device settings screen;
a display device; and
a display controller that performs control in such a way that the returning to the home screen is prohibited so as to not display the home screen on the display device in a case where the instruction is received by the hardware button between commencement of processing to transition to a setting mode of a device and completion of the processing to transition to the setting mode,
wherein the display controller also performs control such that, when an instruction to display another device setting screen is received at a specific timing between commencement of processing to end the setting mode, which starts upon receipt of the instruction to return to the home screen by the hardware button, and completion of the processing to end the setting mode, the instruction to display another device setting screen is ignored so as to prohibit execution of the instructed display of another device setting screen,
wherein the instruction to display another device setting screen is received via the display device.

2. The information processing apparatus according to claim 1,
wherein the display controller performs control in such a way that the returning to the home screen is prohibited until an exit from a state where the device is prohibited from operating.

3. The information processing apparatus according to claim 2,
wherein the display controller performs control in such a way that the device settings screen is displayed until the exit from the state where the device is prohibited from operating.

4. The information processing apparatus according to claim 1,
wherein the display controller performs control in such a way that the returning to the home screen takes place in response to an exit from a state where the device is prohibited from operating.

5. A device control apparatus comprising:
an operation display that receives an operation of a user, and displays an operation state;
a hardware button that receives an instruction from the user to return to a home screen from a device settings screen of the operation display; and
a display controller that controls the operation display to display the device settings screen and not display the home screen in a case where the instruction to return to the home screen is received by the hardware button between commencement of processing to transition to a setting mode of a device and completion of the processing to transition to the setting mode,
wherein the display controller also performs control such that, when an instruction to display another device setting screen is received at a specific timing between commencement of processing to end the setting mode, which starts upon receipt of the instruction to return to the home screen by the hardware button, and completion of the processing to end the setting mode, the instruction to display another device setting screen is ignored so as to prohibit execution of the instructed display of another device setting screen,
wherein the instruction to display another device setting screen is received via the operation display.

6. The device control apparatus according to claim 5,
wherein the display controller performs control in such a way that the returning to the home screen is prohibited until an exit from a state where the device is prohibited from operating.

7. The device control apparatus according to claim 6,
wherein the display controller performs control in such a way that the device settings screen is displayed until the exit from the state where the device is prohibited from operating.

8. The device control apparatus according to claim 5,
wherein the display controller performs control in such a way that the returning to the home screen takes place in response to an exit from a state where the device is prohibited from operating.

9. A non-transitory computer readable medium storing a program causing a computer to execute a process comprising:
receiving an instruction to return to a home screen from a device settings screen;
performing control in such a way that the returning to the home screen is prohibited so as to not display the home screen on a display device in a case where the instruction is received between commencement of processing to transition to a setting mode of a device and completion of the processing to transition to the setting mode; and
performing control such that, when an instruction to display another device setting screen is received at a specific timing between commencement of processing to end the setting mode, which starts upon receipt of the instruction to return to the home screen by the hardware button, and completion of the processing to end the setting mode, the instruction to display another device setting screen is ignored so as to prohibit execution of the instructed display of another device setting screen, wherein the instruction to display another device setting screen is received via the display device.

10. The non-transitory computer readable medium according to claim 9,
wherein control is performed in such a way that the returning to the home screen is prohibited until an exit from a state where the device is prohibited from operating.

11. The non-transitory computer readable medium according to claim 10,
wherein control is performed in such a way that the device settings screen is displayed until the exit from the state where the device is prohibited from operating.

12. The non-transitory computer readable medium according to claim 9,
wherein control is performed in such a way that the returning to the home screen takes place in response to an exit from a state where the device is prohibited from operating.

* * * * *